(12) United States Patent
Eldridge et al.

(10) Patent No.: US 10,998,116 B2
(45) Date of Patent: May 4, 2021

(54) VDT WITH HIGH PERMEABILITY SHIELD

(71) Applicant: Hamilton Sundstrand Corporation, Charlotte, NC (US)

(72) Inventors: Jeffrey A. Eldridge, Ellington, CT (US); Steven A. Avritch, Bristol, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 283 days.

(21) Appl. No.: 15/903,611

(22) Filed: Feb. 23, 2018

(65) Prior Publication Data

US 2019/0267175 A1    Aug. 29, 2019

(51) Int. Cl.
| | |
|---|---|
| *H01F 21/04* | (2006.01) |
| *G01D 5/20* | (2006.01) |
| *G01D 5/22* | (2006.01) |
| *H01F 29/02* | (2006.01) |

(52) U.S. Cl.
CPC .......... *H01F 21/04* (2013.01); *G01D 5/2066* (2013.01); *G01D 5/2291* (2013.01); *H01F 29/025* (2013.01)

(58) Field of Classification Search
CPC .. G01D 5/2291; G01D 5/2066; G01D 5/2053; G01D 5/2046; G01D 5/2216; H01F 21/04; H01F 21/065; H01F 21/06; H01F 29/025
See application file for complete search history.

(56) References Cited

U.S. PATENT DOCUMENTS

| | | | |
|---|---|---|---|
| 4,678,991 A * | 7/1987 | Schmidt | G01D 5/2291 318/657 |
| 4,864,223 A | 9/1989 | Joder et al. | |
| 5,864,215 A | 1/1999 | Shen et al. | |
| 6,311,566 B1 | 6/2001 | Ferguson | |
| 7,679,361 B2 * | 3/2010 | Niwa | G01D 3/02 324/207.16 |

(Continued)

FOREIGN PATENT DOCUMENTS

| | | |
|---|---|---|
| JP | H03146644 A | 6/1991 |
| JP | 2008122254 | 5/2008 |
| WO | 2006077515 A2 | 7/2006 |

OTHER PUBLICATIONS

Heanji Super-Metals Co., Ltd, Mumetal Magnetic Shielding, Apr. 2015 (Year: 2015).*

(Continued)

*Primary Examiner* — Huy Q Phan
*Assistant Examiner* — Dustin R Dickinson
(74) *Attorney, Agent, or Firm* — Carlson, Gaskey & Olds, P.C.

(57) ABSTRACT

An example actuator assembly includes an actuator configured to move a rod. A variable differential transformer (VDT) is situated adjacent to the actuator. The VDT includes a core coupled to the rod such that movement of the rod causes a corresponding movement of the core. A plurality of windings surround the core for measuring displacement of the core. A shield surrounds the plurality of windings and shields the plurality of windings from a magnetic field of the actuator. The shield having a maximum permeability of 50,000-500,000. A LVDT configuration method is also disclosed.

9 Claims, 6 Drawing Sheets

(56) References Cited

U.S. PATENT DOCUMENTS

| | | | | |
|---|---|---|---|---|
| 8,672,291 | B2* | 3/2014 | Tyler | H01F 7/1607 |
| | | | | 251/129.04 |
| 2002/0167384 | A1* | 11/2002 | Paris | H01F 21/06 |
| | | | | 336/115 |
| 2007/0085443 | A1* | 4/2007 | Cutsforth | H01R 39/40 |
| | | | | 310/239 |
| 2007/0152459 | A1* | 7/2007 | Fisher | G01D 5/2291 |
| | | | | 294/103.1 |
| 2007/0272179 | A1* | 11/2007 | Luercho | F01L 3/085 |
| | | | | 123/90.11 |
| 2009/0242200 | A1* | 10/2009 | Badoux | G01N 27/9006 |
| | | | | 166/255.2 |
| 2014/0265580 | A1 | 9/2014 | Cooley et al. | |
| 2017/0219394 | A1 | 8/2017 | Lukito | |
| 2018/0252553 | A1* | 9/2018 | Daniels | G01D 18/00 |

OTHER PUBLICATIONS

Extended European Search Report for European Patent Application No. 19158623.9 completed Jul. 18, 2019.

Carpenter, Technical Datasheet, "CarTech® High Permeability "49"® Alloy", Printer Jan. 5, 2018, Edition Date May 27, 2003, Downloaded from: https://cartech.ides.com/datasheet.aspx?i=102&E=207 &c.

Honger Technology (HK) Limited, "PB Permalloy Strip with High Saturation Induction" Printed Jan. 19, 2018, Downloaded from: http://www.hongertech.com/pb-permalloy-strip-with-high-saturation-induction_p34.html.

* cited by examiner

VDT WITH HIGH PERMEABILITY SHIELD

BACKGROUND

This application relates to sensors, and more particularly to magnetic interference mitigation for variable differential transformer (VDT) sensors.

A linear actuator is used to provide axial movement and move a component attached to the linear actuator to a desired position. A linear variable differential transformer (LVDT) is a type of VDT that can be used for measuring linear displacement of a LVDT core that is movable along a central longitudinal axis of the LVDT. An LVDT core can be coupled to a forcer rod of a linear actuator to measure movement of the forcer rod. The LVDT includes a plurality of windings that wind around the core, and a longitudinal shield that surrounds the plurality of windings. The windings include a primary winding that is disposed between two secondary windings.

When the primary winding is energized, a magnetic field is provided that induces a voltage in the secondary windings. If the LVDT core is moved along its central longitudinal axis, a magnetic field within the LVDT changes and provides a difference between the voltages of the secondary windings. That differential is measurable to determine a linear displacement of the LVDT core.

SUMMARY

An example actuator assembly includes an actuator configured to move a rod. A variable differential transformer (VDT) is situated adjacent to the actuator. The VDT includes a core coupled to the rod such that movement of the rod causes a corresponding movement of the core. A plurality of windings surround the core for measuring displacement of the core. A shield surrounds the plurality of windings and shields the plurality of windings from a magnetic field of the actuator. The shield has a maximum permeability of 50,000-500,000 B/H (where "B" refers to a flux density in Gausses and "H" refers to a magnetizing force in Oersteds).

An example method of configuring a VDT includes situating a VDT adjacent to an actuator. The VDT includes a core and a plurality of windings that surround the core for measuring displacement of the core. The method includes coupling an actuator rod of the actuator to the core such that movement of the rod causes a corresponding movement of the core. A shield is situated around the plurality of windings. The shield is configured to shield the plurality of windings from a magnetic field of the actuator, and the shield has a maximum permeability of 50,000-500,000 B/H.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
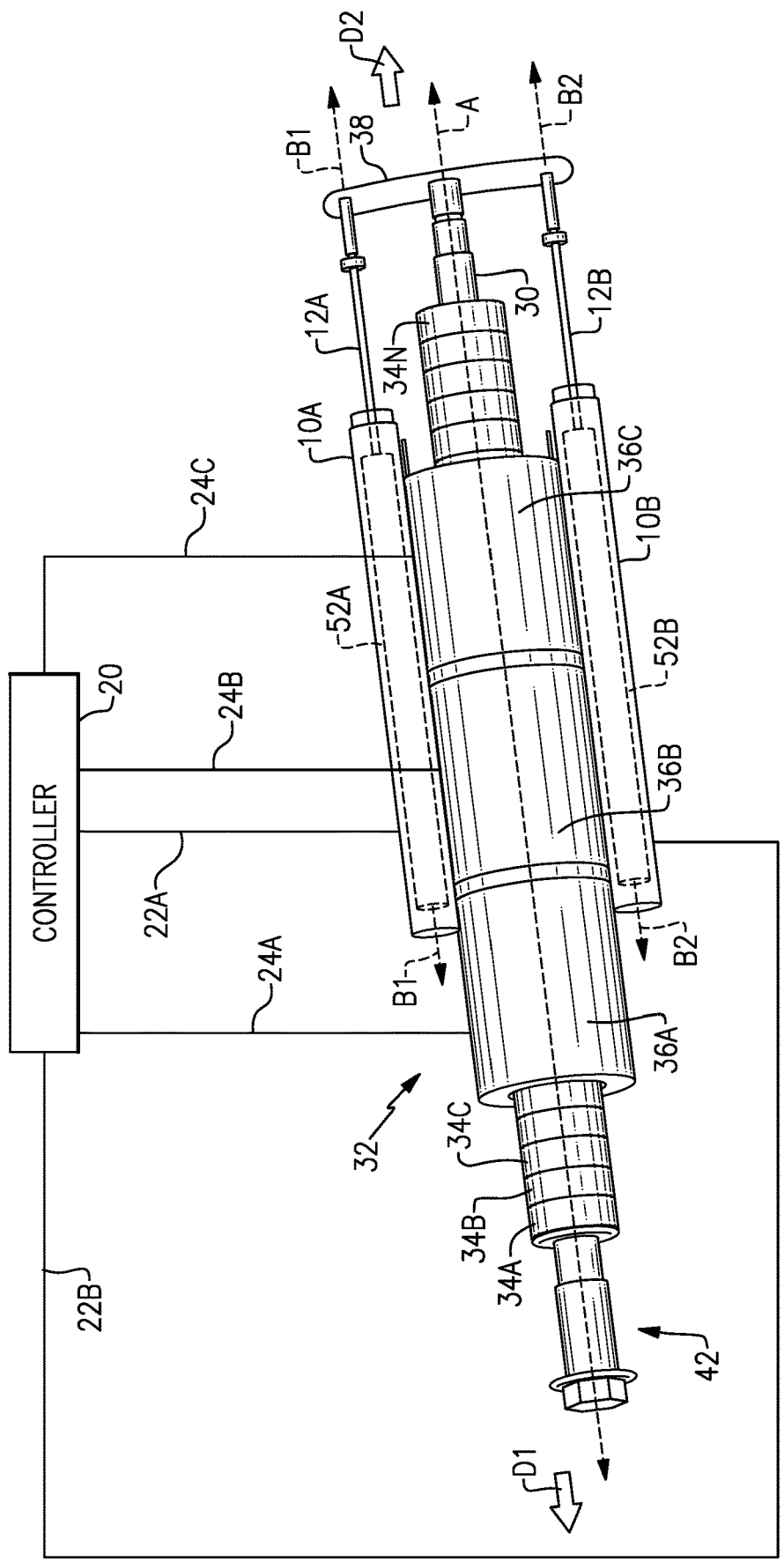
FIG. 1 is a schematic view of a plurality of LVDTs configured to measure linear displacement of a linear actuator.

FIG. 1 is a schematic view of a plurality of LVDTs 10A-B that are redundantly configured to measure a linear displacement of a forcer rod 30 of a linear actuator 32. The forcer rod 30 is linearly movable along a central longitudinal axis A of the linear actuator 32.

A plurality of magnets 34 surround the forcer rod 30 along a length of the rod between a first magnet 34A and a last magnet 34N. The linear actuator 32 includes a plurality of stators 36A-C. The forcer rod 30 is movable along the central longitudinal axis A by applying a voltage to one or more of the stators 36. If a voltage is provided in each of the three stators 36A-C, they can cooperately move the rod along the longitudinal axis A. In the example of FIG. 1, the forcer rod 30 and plurality of stators 36A-C are cylindrical.

Each LVDT 10A-B includes a respective extension rod 12A-B that extends from and is coaxial with a respective LVDT core 52A-B. Core 52A and extension rod 12A are movable along central longitudinal axis B1, and core 52B and extension rod 12B are movable along central longitudinal axis B2. A transfer plate schematically shown as 38 couples the forcer rod 30 to the extension rods 12A-B so that axial movement of the forcer rod 30 is transferred to the LVDT cores 52A-B. In particular, axial movement of the forcer rod 30 by a distance in a direction D1 or D2 along the central longitudinal axis A moves the LVDT cores 52A-B and their respective extension rods 12A-B along their respective central longitudinal axes B1, B2 by the same distance in the same direction. Movement of the cores 52A-B is measurable by the LVDTs 10A-B to determine a linear displacement of the cores 52A-B, which can then be used to determine a linear displacement of the forcer rod 30 because the linear displacement is the same.

A controller 20 communicates with the LVDTs 10 using lines schematically shown as 22A-B to determine a linear displacement of the LVDTs 10, and based on that determines a position of the forcer rod 30. The controller 20 controls the stators 36A-C using lines schematically shown as 24A-C to move the forcer rod 30 to a desired position based on position feedback from the LVDTs 10.

Figure 2:
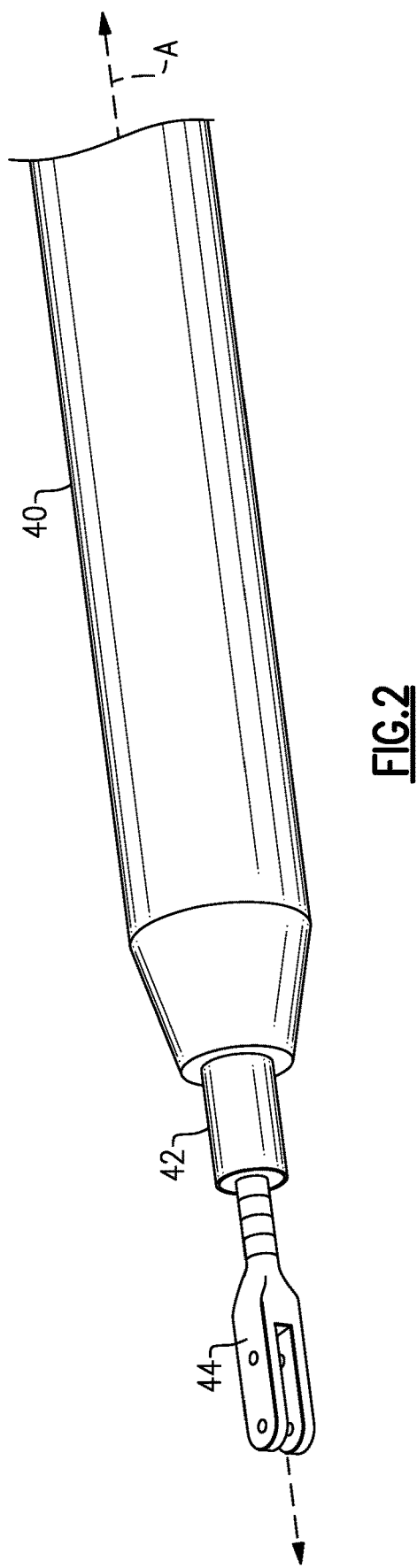
FIG. 2 illustrates an example housing for the LVDTs and a linear actuator.

FIG. 2 illustrates an example housing 40 for the LDVTs 10A-B and linear actuator 32. The example housing 40 encloses the LVDTs 10A-B and encloses a majority of the linear actuator 32. A portion 42 of the forcer rod 30 extends out of the housing 40 and attaches to a head 44 for moving a load.

Figure 3:
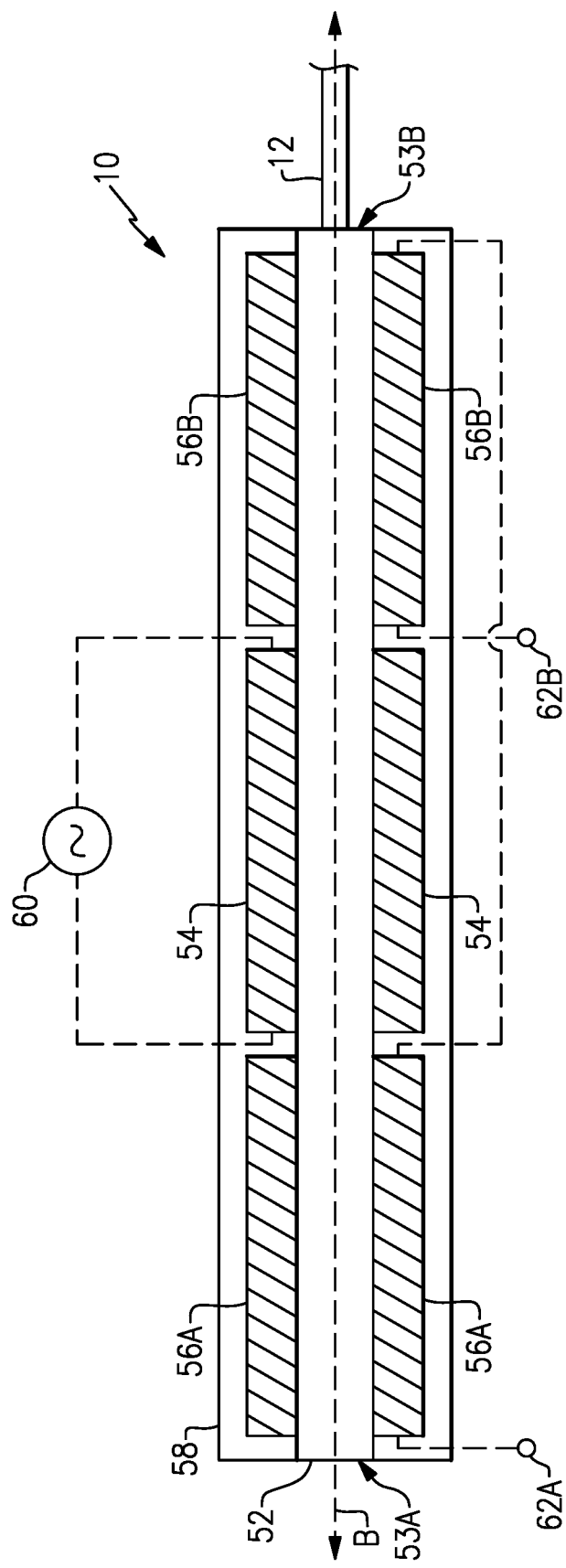
FIG. 3 is a schematic view of an example LVDT.

FIG. 3 is a schematic view of an example LVDT 10. The LVDT 10 includes a core 52 that extends between opposing ends 53A-B and that is moveable along a central longitudinal axis B. The extension rod 12 extends from and is secured to end 53B of the core 52. A plurality of windings 54, 56A, 56B wind around the core 52. The winding 54 is a primary winding, and is situated axially between secondary windings 56A, 56B. A shield 58 surrounds the windings 54, 56A, 56B. In the example of FIG. 3, the core 52 and shield 58 are cylindrical.

A power source 60 is connected to opposing ends of the winding 54. When the power source 60 energizes the primary winding 54, a magnetic field is provided that induces a voltage in the secondary windings 56A, 56B. As the LVDT core 52 moves along axis B, a magnetic field within the LVDT 10 changes and provides a difference between the respective voltages on the two secondary windings 56A-B, which is measurable using terminals 62A-B to determine a linear displacement of the LVDT core 52. The terminals 62A-B and power source 60 are controlled and/or operatively connected to the controller 20 in one example.

LVDT shields are generally composed of a low permeability material such as stainless steel which provides very limited shielding from electromagnetic interference (EMI). Permeability is a material property that describes the ease with which a magnetic flux is established in a component. In one example, permeability is measured $$M=B/H \quad \text{(equation 1)}$$

where:
M is a permeability of a material;
B is a flux density of the material; and
H is a magnetizing field of the material.

A maximum permeability is a point where the slope of a B/H curve for the unmagnetized material is the greatest, with B representing the y-axis and H representing the x-axis is the greatest on the curve. A typical maximum permeability for stainless steel is 200.

When an LVDT that utilizes such a low permeability shield is placed in proximity to a magnetic field, such as one from the linear actuator 32, that magnetic field can cause errors in the output of the LVDT, reducing LVDT accuracy and resulting in incorrect motor forcer rod 30 position calculations, leading to erroneous position commands being sent to the stators 36A-C for axial movement of the linear actuator 32.

The LVDTs 10A-B mitigate this issue by using an improved shield 58 that is composed of a high permeability alloy that shields the plurality of windings 56A-C from electromagnetic interference (EMI) from the linear actuator 32 outside of the LVDT 10.

In one example, the shield 58 has a maximum permeability of 50,000-500,000 H/m. In one example, the shield 58 has a maximum permeability of at least 60,000 B/H. In one example, the shield 58 has a maximum permeability of at least 70,000 B/H. In one example, the shield 58 has a maximum permeability of at least 75,000 B/H.

In one example, the shield 58 is at least partially composed of nickel and iron. In one example, the shield 58 is composed of the CARTECH 49® alloy from CARPENTER, which includes 48.0% nickel, 0.5% manganese, 0.35% silicon, and 0.02% carbon, and a balance of iron. In one example, the shield 58 is composed of the CO-NETIC® alloy, which includes 80-81% nickel, 4.5-6% molybdenum, 0.05-0.4% silicon, 0-0.5% manganese, 0.01% carbon, and a balance of iron.

In this disclosure, like reference numerals designate like elements where appropriate and reference numerals with the addition of one-hundred or multiples thereof designate modified elements that are understood to incorporate the same features and benefits of the corresponding elements.

Figure 4:
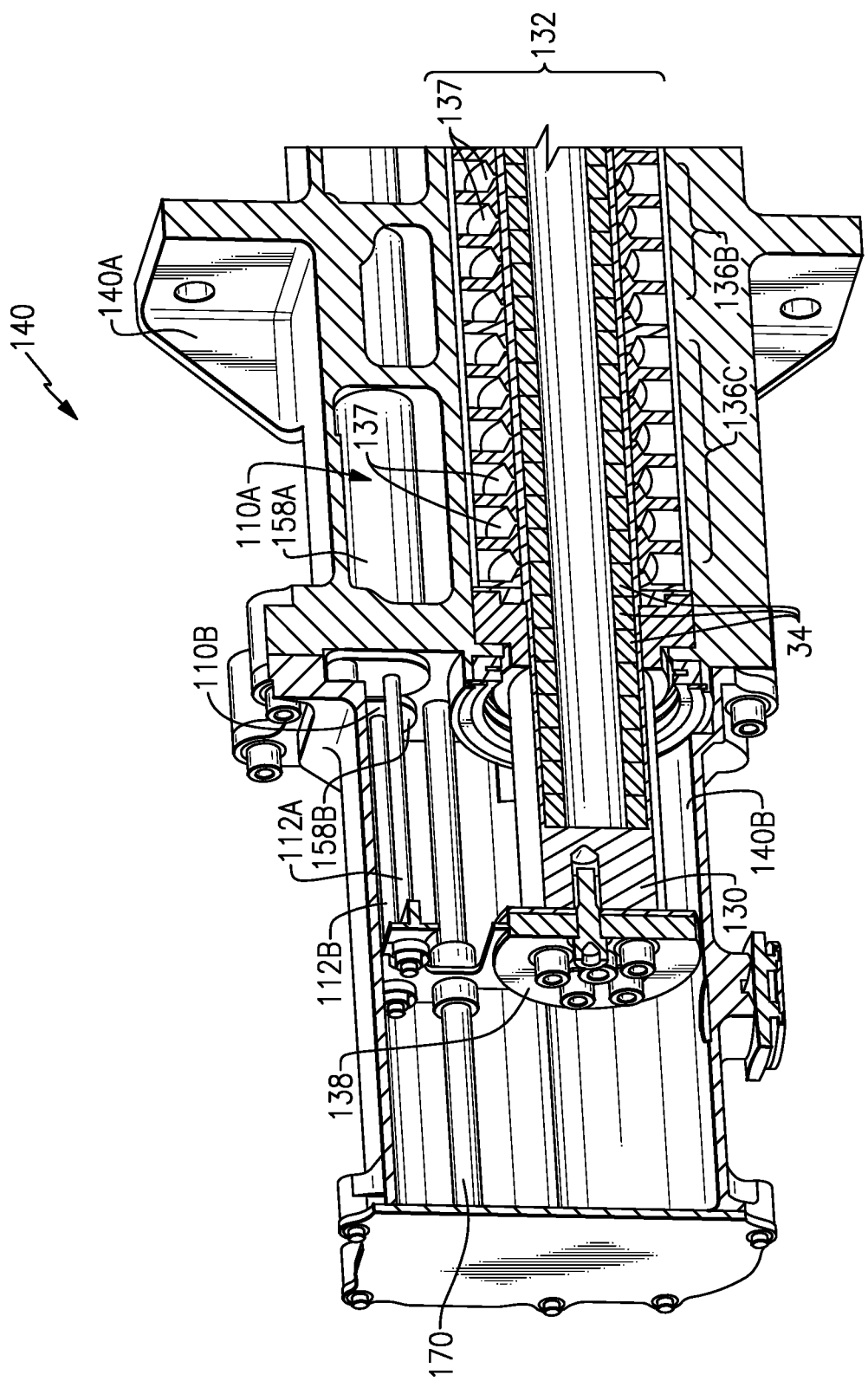
FIG. 4 illustrates a cross sectional view of another example housing for LVDTs and a linear actuator.

FIG. 4 illustrates a cross sectional view of an example housing 140 that encloses a LVDT 110A, a LVDT 110B, a transfer plate 138, and at least a portion of a linear actuator 132. Each LVDT 110A-B includes a respective extension rod 112A-B that is coaxial with and secured to a respective core 152A-B of the LVDTs 110A-B (e.g., fastened to, welded to, or integral with the respective core 152). The transfer plate 138 is secured to the extension rods 112A-B and to a forcer rod 130 of the linear actuator 132. Stators 136 surround the forcer rod 130. Each stator 136 includes a plurality of respective windings 137. A plurality of magnets 134 surround the forcer rod 130.

The housing 140 includes a first housing portion 140A and a second housing portion 140B that is mounted to the first housing portion 140A. The transfer plate 138 is disposed within the second housing portion 140B. A guide rod 170 extends through the transfer plate 138 and is fixed relative to the housing 140. The guide rod 170 guides axial movement of the transfer plate 138 and correspondingly also the forcer rod 130 and extension rods 112A-B. The guide rod 170 also prevents rotation of the transfer plate 138 within the housing portion 140B. Respective shields 158A-B of the LVDTs 110A-B shield the windings (not shown in FIG. 4) within the LVDTs 110A-B from a magnetic field of the linear actuator 132.

Although LVDTs are described above, the same shield material could be used for other types of variable differential transformers, such as rotary variable differential transformers (RVDTs).

Figure 5A:
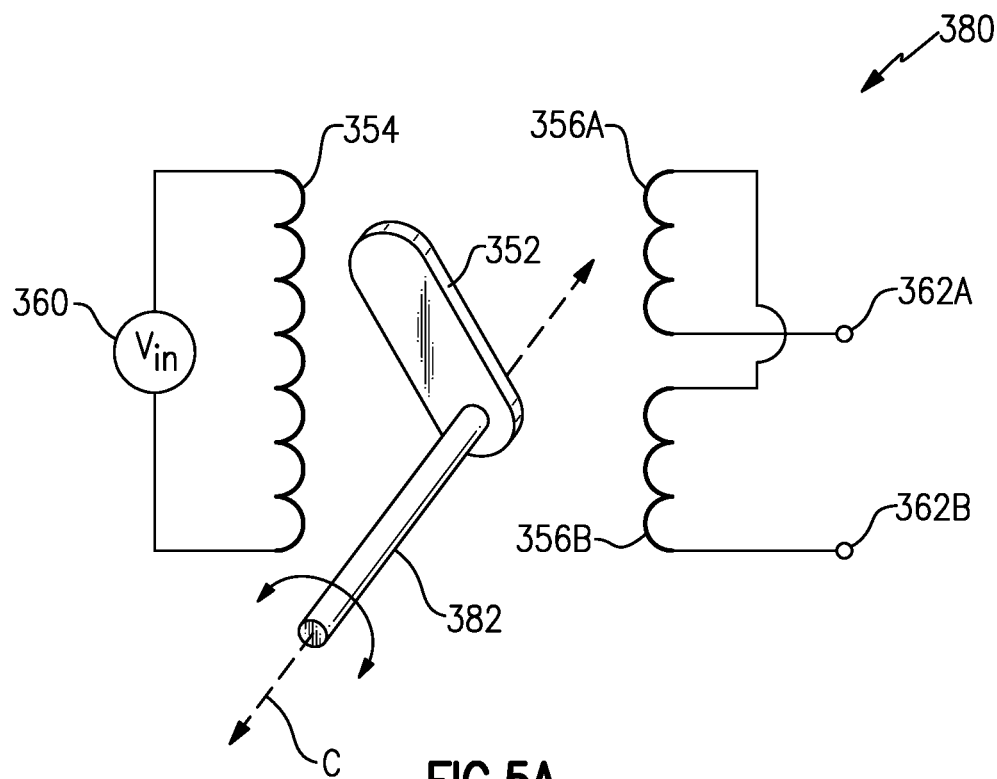
FIG. 5A is a first schematic view of an example rotational variable differential transformer (RVDT) configured to measure rotational displacement of a stepper motor.

FIG. 5A is a first schematic view of an example RVDT 380 that is configured to measure rotational displacement. The RVDT 380 includes a magnetic core 352 that is connected to a shaft 382 that is generally perpendicular to the core 352. The shaft 382 and core 285 are configured to corotate about a longitudinal axis C. The RVDT 380 includes a primary winding 354, and two secondary windings 356A-B are schematically shown. A power source 360 is connected to opposing ends of the winding 354. When the power source 60 energizes the primary winding 54, a magnetic field is provided that induces a voltage in the secondary windings 356A, 356B. As the RVDT core 352 rotates about longitudinal axis B, a magnetic field within the RVDT 380 changes and provides a difference between the respective voltages on the two secondary windings 356A-B, which is measurable using terminals 362A-B to determine a rotational displacement of the RVDT core 52.

Figure 5B:
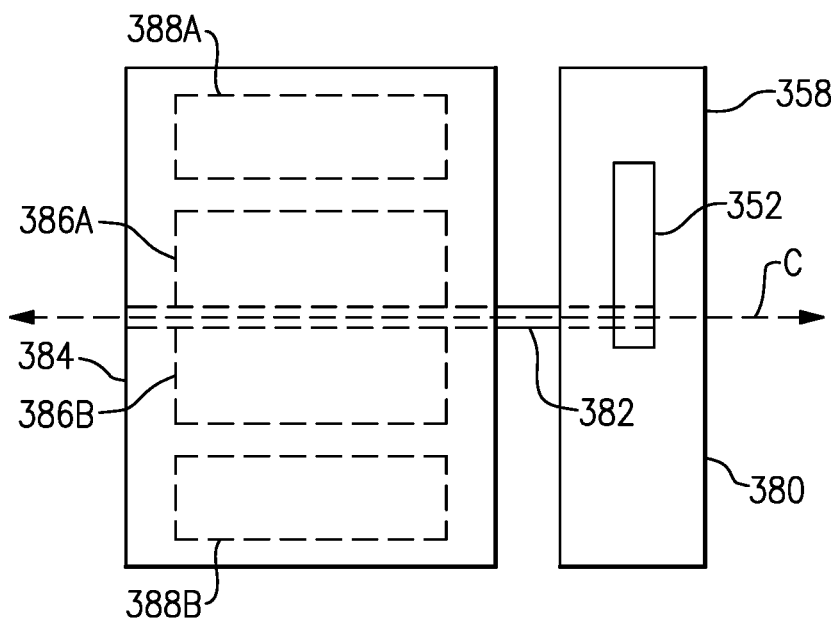
FIG. 5B is a second schematic view of the example RVDT of FIG. 5A.

FIG. 5B is a schematic view of the RVDT 380 adjacent to an actuator 384. The actuator 384 includes two rotors 386A-B that are coupled to the shaft 382. Stators 388A-B are configured to provide a magnetic field that rotates the rotors 386A-B, which causes rotation of the shaft 382. The rotors 386A-B and core 352 are both coupled to the shaft 382 and corotate about the longitudinal axis C. Through this corotation, the RVDT 380 is configured to measure rotational displacement of the actuator 384. In one example, the actuator 384 is a stepper motor having a predefined range of rotation (e.g., ±60°). The RVDT 380 includes a shield 358 that can include the same features as any of the shields 58 discussed above in connection with LVDT 10 to shield the windings 354, 356 from a magnetic field of the actuator 384.

Figure 6:
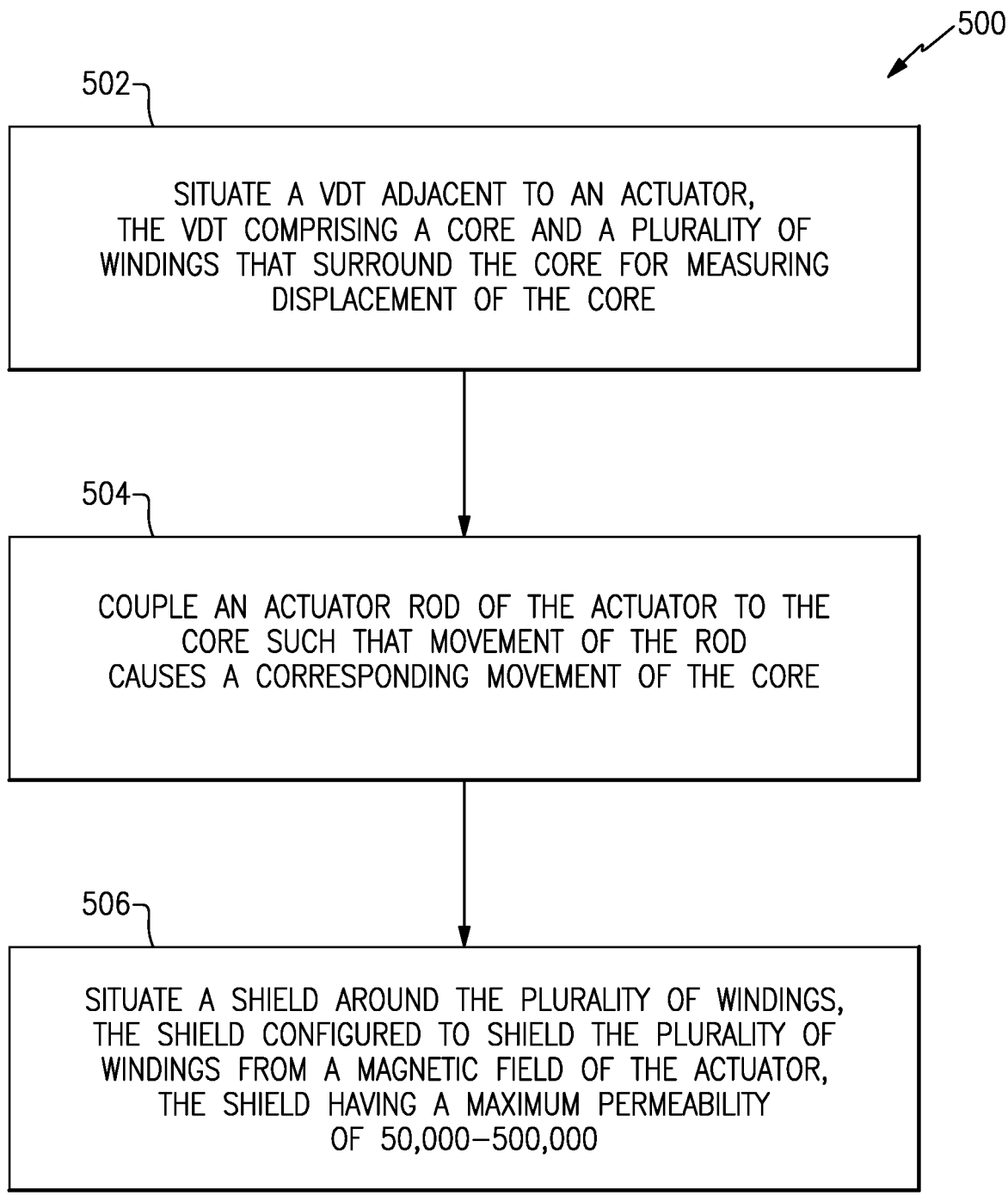
FIG. 6 is a flowchart of an example method of configuring a VDT.

FIG. 6 is a flowchart of an example method 500 of configuring any of the VDTs discussed above. The method 500 includes situating a VDT 10/380 adjacent to an actuator 32/384 (step 502). The VDT 10/380 includes a core 52/352 and a plurality of windings 54/354, 56/356 that surround the core 52/352 for measuring displacement of the core 52/352. A rod 30/382 of the actuator 32/380 is coupled to a core 52/352 of the VDT 10/380 such that movement of the rod 30/382 causes a corresponding movement of the core 52/352 (step 204). A shield 58/358 is situated around the plurality of windings 54/354, 56/356 of the VDT 10/380 that shield the plurality of windings 54/354, 56/356 from a magnetic field of the actuator 32/380 (step 506). The shield 58/358 has a maximum permeability of 50,000-500,000 B/H.

The LVDT shielding discussed above enables close proximity between LVDTs 10 and linear actuators 32 while mitigating the disruptive effect that magnetic field of the stator(s) 36 would otherwise have on the windings 54, 56 if a traditional low permeability stainless steel shielding were used.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An actuator assembly comprising:
    an actuator configured to move a rod; and
    a linear variable differential transformer (LVDT) situated adjacent to the actuator, the LVDT comprising:
    a core coupled to the rod such that axial movement of the rod by a distance in a direction causes a corresponding movement of the core by the same distance in the same direction;
    a plurality of windings that surround the core for measuring displacement of the core; and
    a shield that surrounds the plurality of windings and shields the plurality of windings from a magnetic field of the actuator, the shield having a maximum permeability of 50,000-500,000 B/H; and
    a transfer plate that couples the rod to the core; wherein:
    the transfer plate is mounted to the rod and to an extension rod that extends from and is coaxial with the core;
    the actuator is a linear actuator comprising at least one stator that surrounds a portion of the rod and is configured to move the rod along a longitudinal axis;
    the LVDT is situated radially outward of the longitudinal axis; and
    the plurality of windings surround the core for measuring linear displacement of the core.

2. The actuator assembly of claim 1, wherein the maximum permeability of the shield is at least 60,000 B/H.

3. The actuator assembly of claim 1, wherein the maximum permeability of the shield is at least 70,000 B/H.

4. The actuator assembly of claim 1, wherein the maximum permeability of the shield is at least 75,000 B/H.

5. The actuator assembly of claim 1, wherein the shield comprises nickel and iron.

6. The actuator assembly of claim 5, wherein the shield comprises non-zero amounts of carbon, silicon, and manganese, each non-zero amount less than 1% of the composition of the shield.

7. The actuator assembly of claim 1, wherein the LVDT, transfer plate, and at least one stator are enclosed in a housing, the housing comprising an opening aligned with the longitudinal axis, the rod movable through the opening.

8. The actuator assembly of claim 7, comprising a guide rod that is fixed relative to the housing and extends through the transfer plate, the guide rod configured to guide movement of the transfer plate and prevent rotation of the transfer plate within the housing, the guide rod parallel to each of the rod and extension rod.

9. The actuator assembly of claim 1, wherein the LVDT is one of a plurality of LVDTs that are each coupled to the rod such that axial movement of the rod by a distance in a given direction moves cores of the plurality of LVDTs by the same distance in the same direction, each LVDT adjacent to the linear actuator and radially outward of the longitudinal axis.

* * * * *